Jan. 7, 1936. J. A. MANNING 2,026,990
DOLL HEAD
Filed June 13, 1934   3 Sheets-Sheet 1
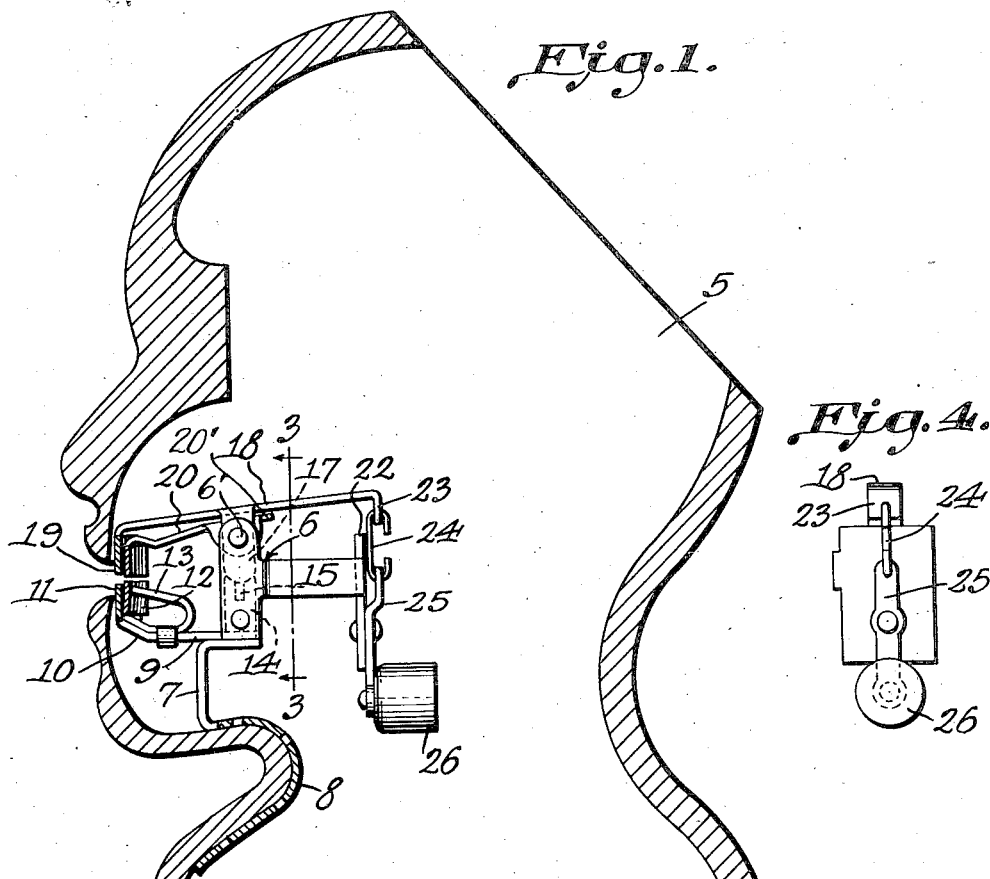
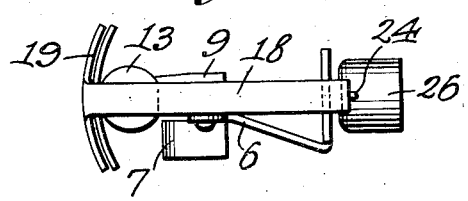
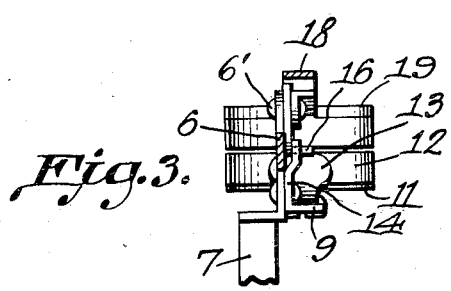
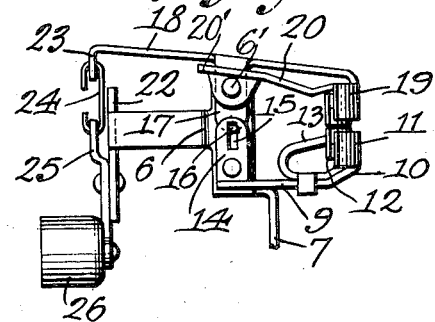
J. A. Manning  Inventor

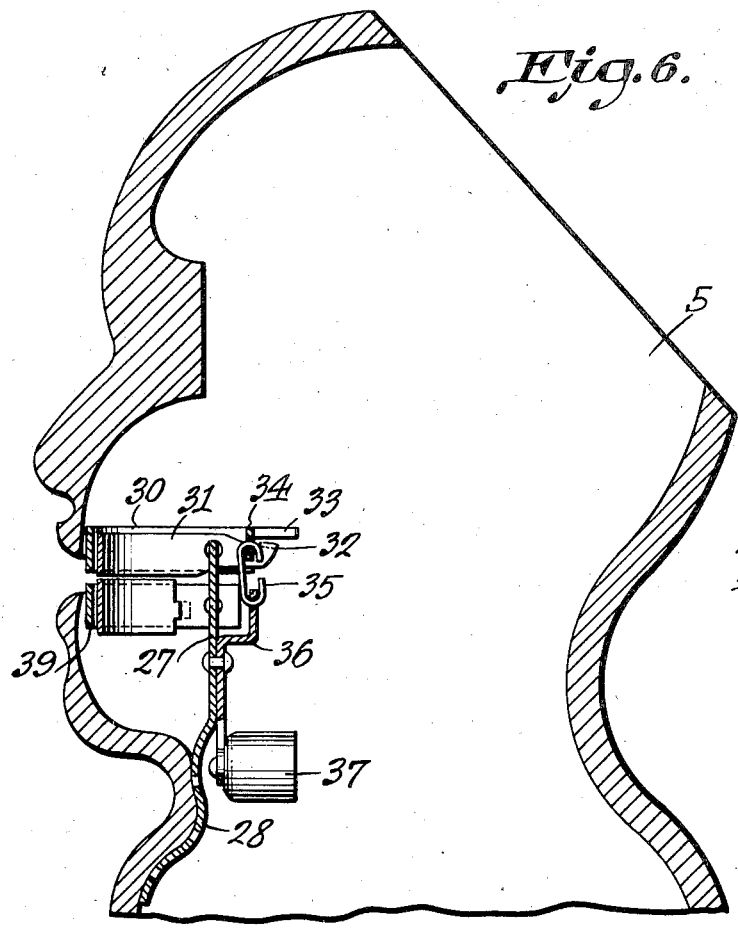

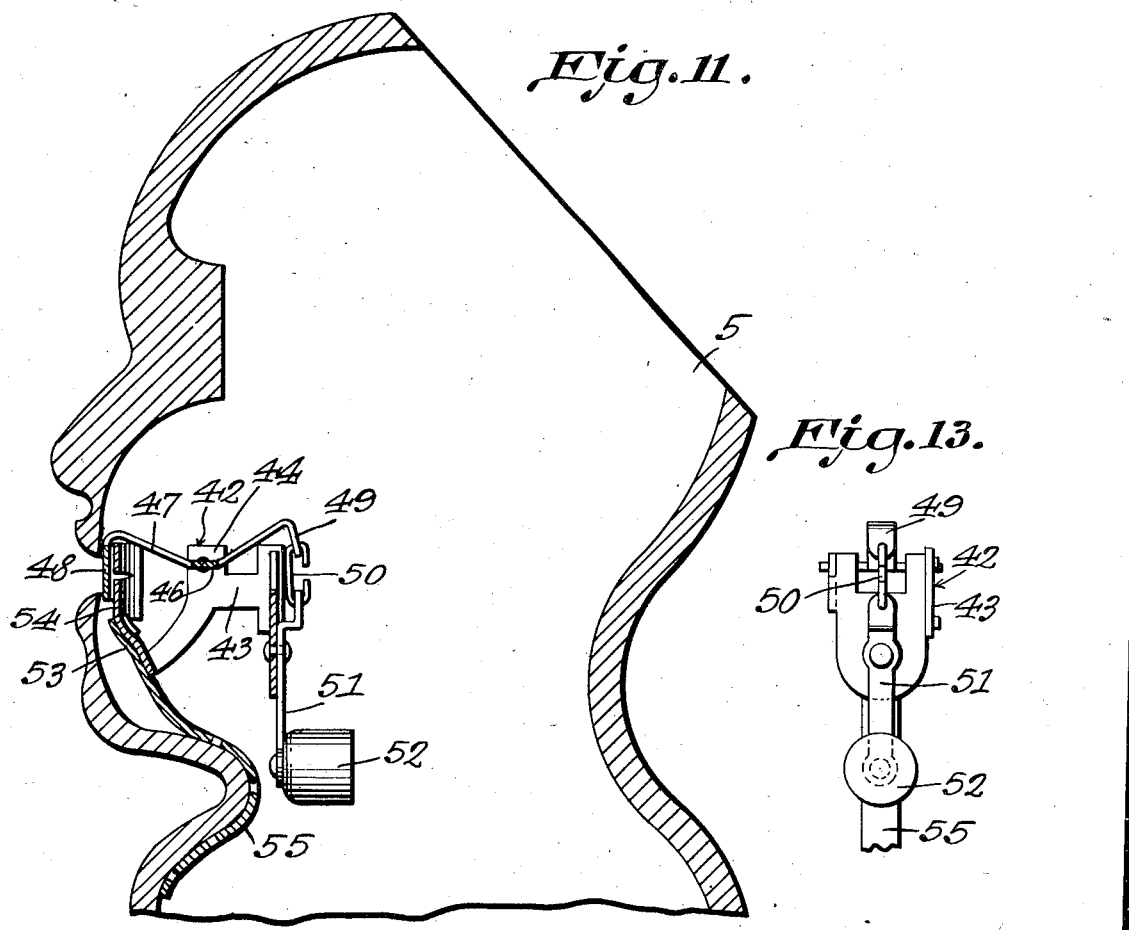

Patented Jan. 7, 1936

2,026,990

UNITED STATES PATENT OFFICE 2,026,990

DOLL HEAD

Joseph A. Manning, Pawtucket, R. I.

Application June 13, 1934, Serial No. 730,510

6 Claims. (Cl. 46—171)

This invention relates to improvements in doll head construction, the primary object of the invention being to provide means mounted for pivotal movement within the head and disposed adjacent to the mouth opening of the doll, simulating the appearance of the natural movements of the jaws and teeth and lips of human beings, when laughing or smiling.

An important object of the invention is to provide a device including pivoted members shaped and colored to simulate the lips and teeth of a person, to the end that the effect will be especially realistic.

A further object of the invention is to provide a device of this character which will be weight-controlled and operated by merely tilting the doll.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a sectional view through a doll head equipped with a movable member constructed to simulate lips, means being provided to expose the teeth and jaws of the doll.

Figure 2 is a plan view of the lip and jaw operating mechanism.

Figure 3 is a sectional view taken on line 3—3 of Figure 1.

Figure 4 is a rear elevational view of the lip and jaw operating mechanism.

Figure 5 is a side elevational view thereof.

Figure 6 is a longitudinal sectional view through a doll head equipped with a modified form of the invention.

Figure 7 is a side elevational view of the jaw and lip operating mechanism.

Figure 8 is a plan view thereof.

Figure 9 is a rear elevational view of the jaw and lip operating mechanism.

Figure 10 is a view illustrating the opposite side of the lip and jaw operating mechanism.

Figure 11 is a longitudinal sectional view through a doll head disclosing a lip operating mechanism supported within the doll head.

Figure 12 is a plan view of the lip operating mechanism.

Figure 13 is a rear elevational view thereof.

Figure 14 is a side elevational view of the lip operating mechanism.

Referring to the drawings in detail, a doll head is indicated generally by the reference character 5, the doll head being provided with the usual eye and mouth openings.

The device forming the subject matter of the invention, includes a supporting bracket 6 which is provided with a downwardly extended portion 7 which is curved as at 8, so that it may fit around the inner surface or the neck portion of the doll head, where it is secured in any suitable and well known manner.

Pivotally mounted on the supporting bracket, is a forwardly extended bar 9 which is formed with an upwardly curved portion 10 having an integral transversely extended plate 11. Mounted on the forwardly extended bar 9, is an arm carrying a transversely extended plate 12 that extends above the plate 11, where it is supplied with markings simulating teeth, there being provided a tongue portion 13 supported on the arm 9 and so arranged that it may be viewed, when the teeth and jaw members are open.

The end of the bar 9 extends upwardly at 14 where it is supplied with an elongated opening 15 that accommodates the laterally extended pin 16, formed on the lower end of the downwardly extended portion 17 of the bar 18, which is pivotally mounted on the bracket 6 at 6'. This bar 18 is provided with a transversely disposed curved plate 19, the plates 11 and 19 being colored red, simulating lips.

Pivotally mounted on the bracket 6 directly under the bar 18, is an arm 20 which extends forwardly to a point adjacent to the curved plate 19, where it is provided with a transversely disposed curved plate 21 supplied with markings indicating teeth. At the rear end of the arm 20 is an extension 20' adapted to be engaged by the bar 18, when the bar 18 swings downwardly a predetermined distance moving the arm 20 vertically.

As clearly shown by Figure 5 of the drawings, the bar 18 is of a length to extend rearwardly to a position adjacent to the plate 22 of the bracket, where the rear end of the bar 18 is extended downwardly at 23 and formed with an opening to receive one end of the link 24. This link 24 also connects with the pivoted arm 25 that carries the weight 26, at its lower end.

Due to this construction it will be seen that a doll head supplied with a jaw and lip operating mechanism constructed in accordance with the invention, may be tilted laterally, causing the weight 26 to swing, operating the bar 18 controlling the movements of the lip sections and jaw sections of the doll.

In the form of the invention as illustrated by sheet 2 of the drawings, the bracket, which is in the form of a wide plate 27, is provided with a downwardly extended reduced portion 28 adapted to be secured within a doll head.

Disposed at the upper end of the plate 28, and extending laterally from the side edges thereof, are pintles 29, which pintles provide supports for the curved outer plate 30 and inner plate 31, the outer plate being colored red simulating lips, while the inner plate is formed with markings to simulate human teeth.

Extending laterally from the inner plate 31, is an ear 32, adapted to be engaged by the extension 33, formed at one end of the outer plate 30. Due to this construction, the outer plate when moved upwardly, will cause the inner plate to move upwardly, after the outer plate has moved a predetermined distance, thereby exposing the teeth of the upper jaw.

One end of the outer plate extends inwardly at 34, where it is provided with an opening to receive one end of the link 35, that has connection with the upper end of the bar 36 carrying the weight 37 at its free end.

Pintles 38 extend laterally from the side plate 27, and are spaced from the pintles 29, said pintles 38 providing a support for the curved plate 39 that provides the lower jaw and lip of the mouth construction.

Extending upwardly from the plate 39, is an ear 40 provided with an elongated opening to receive the pin 41 that extends from the upper section of the jaw construction, so that as the pin 41 moves forwardly in the arc of a circle, the plate 39 swings downwardly.

In the modified form of the invention as shown by sheet 3 of the drawings, the bracket which is indicated by the reference character 42 embodies spaced side members 43 formed with upstanding ears 44 that have openings to accommodate the reduced ends 45 of the bar 46, the bar 46 being formed integral with the bar 47 that is provided with a curved plate 48 at its forward end, the curved plate 48 being colored red, simulating the human lips.

The rear end of the bar 47 extends downwardly at 49, where it is supplied with an opening to receive one end of the link 50, which link also passes through an opening formed in the upper end of the bar 51 which carries a weight 52 at the lower end thereof.

Extending upwardly from the frame, is a bar 53 that is supplied with a curved plate 54 having markings simulating upper and lower teeth.

The lower portion of this bar, is curved as at 55, where it is secured to the inner surface of the doll head.

When the doll head is tilted laterally, the weight will operate, swinging the bar 47 exposing the curved plate 54.

Having thus described the invention, what is claimed is:

1. The combination with a doll head having a mouth opening, a lower pivoted member and an upper pivoted member mounted within the head, a member pivotally mounted within the head and adapted to move over the upper member partially concealing the upper member, the upper pivoted member adapted to engage the lower pivoted member restricting downward movement of the upper pivoted member, weighted means for moving the member operating over the upper member, means for transmitting movement of the member moving over the upper member, to the upper member.

2. The combination with a doll head having a mouth opening, a lower pivoted member and an upper pivoted member mounted within the head, a member pivotally mounted within the head and adapted to move over the upper member partially concealing the upper member, the upper pivoted member adapted to engage the lower pivoted member restricting downward movement of the upper pivoted member, weighted means for moving the member operating over the upper member, means for transmitting movement of the member moving over the upper member to the upper member and lower pivoted member.

3. The combination with a doll head having a mouth opening, a bracket mounted within the head, a lower pivoted member mounted on the bracket, an upper pivoted member including an inner plate and an outer pivoted bar adapted to partially conceal the inner plate, an ear extending from the inner plate, an extension on the outer plate, weighted means for moving the outer plate, and said extension adapted to engage the ear moving the inner plate with the outer plate.

4. The combination with a doll head having a mouth opening, of a device including a lower member and an upper member embodying an inner plate and a member movable over the inner plate viewed through the opening, means for pivotally mounting the plate and member operating thereover, means for moving the plate and member moving thereover and said moving means including means whereby the member operating over the plate is moved in advance of the plate.

5. The combination with a doll head having a mouth opening of upper and lower pivoted members mounted within the head and visible through the mouth opening, a bracket on which the members are mounted, a member movable over the upper member, means for moving the upper member and the member operating thereover, whereby the last mentioned member is moved in advance of the upper member.

6. The combination with a doll head having a mouth opening, a member simulating teeth mounted within the doll head and visible through the mouth opening, a guard plate operating over said member and adapted to normally partially conceal said member, gravity operated means for moving the guard plate and member, said guard plate being movable in advance of said member.

JOSEPH A. MANNING.